United States Patent
Tanaka et al.

(10) Patent No.: US 8,972,117 B2
(45) Date of Patent: Mar. 3, 2015

(54) VEHICULAR LIGHT DISTRIBUTION CONTROL SYSTEM AND VEHICULAR LIGHT DISTRIBUTION CONTROL METHOD

(75) Inventors: Seiichi Tanaka, Nisshin (JP); Satoshi Fujiyoshi, Nagoya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 117 days.

(21) Appl. No.: 13/882,380

(22) PCT Filed: Nov. 12, 2010

(86) PCT No.: PCT/JP2010/070229
§ 371 (c)(1),
(2), (4) Date: Apr. 29, 2013

(87) PCT Pub. No.: WO2012/063365
PCT Pub. Date: May 18, 2012

(65) Prior Publication Data
US 2013/0218413 A1 Aug. 22, 2013

(51) Int. Cl.
*G06F 17/00* (2006.01)
*B60Q 1/00* (2006.01)
(Continued)

(52) U.S. Cl.
CPC ........... *B60Q 1/085* (2013.01); *B60Q 1/143* (2013.01); *B60Q 2300/056* (2013.01); *B60Q 2300/41* (2013.01); *B60Q 2300/42* (2013.01);
(Continued)

(58) Field of Classification Search
CPC ............ B60Q 2300/056; B60Q 2300/41; B60Q 2300/42; B60Q 2300/112; B60Q 2300/122; B60Q 2300/322; B60Q 1/085; B60Q 1/143

USPC .......... 701/1, 36, 49; 340/457.2, 468–469; 362/459, 464–466, 507
See application file for complete search history.

(56) References Cited

U.S. PATENT DOCUMENTS 3,697,803 A * 10/1972 Hicks ................. 315/82
5,645,338 A * 7/1997 Kobayashi ........... 362/466
(Continued)

FOREIGN PATENT DOCUMENTS

DE 102008039091 A1 5/2009
DE 102008014182 A1 9/2009
(Continued)

OTHER PUBLICATIONS

International Search Report of PCT/JP2010/070229 dated Jan. 25, 2011.

*Primary Examiner* — Khoi Tran
*Assistant Examiner* — Abby Lin
(74) *Attorney, Agent, or Firm* — Sughrue Mion, PLLC (57) ABSTRACT

A vehicular light distribution control system (100) controls a light distribution of headlights (3). The control system includes the following parts. The vehicle detecting part (10) detects an anterior vehicle driving in front of an occupants vehicle. The unirradiated region setting part (12) sets a region where the anterior vehicle detected by the vehicle detecting part (10) exists as an unirradiated region. The vehicle motion estimating part (13) estimates an ensuing motion of the anterior vehicle detected by the vehicle detecting part (10). The unirradiated region adjusting part (14) adjusts a size of the unirradiated region set by the unirradiated region setting part (12) depending on an estimated result 15 of the vehicle motion estimating part (13).

8 Claims, 10 Drawing Sheets

(51) Int. Cl.
*F21V 1/00* (2006.01)
*B60Q 1/08* (2006.01)
*B60Q 1/14* (2006.01)

(52) U.S. Cl.
CPC ..... *B60Q2300/112* (2013.01); *B60Q 2300/122* (2013.01); *B60Q 2300/322* (2013.01)
USPC .............. 701/49; 362/465; 362/507; 340/469

(56) References Cited

U.S. PATENT DOCUMENTS

| | | | |
|---|---|---|---|
| 6,166,698 A * | 12/2000 | Turnbull et al. | 343/713 |
| 7,449,997 B2 * | 11/2008 | Furusawa et al. | 340/468 |
| 7,510,310 B2 * | 3/2009 | Komatsu | 362/466 |
| 8,408,763 B2 * | 4/2013 | Ehm | 362/464 |
| 2004/0052083 A1 * | 3/2004 | Daicho et al. | 362/466 |
| 2006/0245199 A1 * | 11/2006 | Brun et al. | 362/465 |
| 2008/0130302 A1 * | 6/2008 | Watanabe | 362/466 |
| 2009/0043458 A1 * | 2/2009 | Kamioka et al. | 701/49 |
| 2010/0033978 A1 * | 2/2010 | Ehm | 362/465 |

FOREIGN PATENT DOCUMENTS

| | | |
|---|---|---|
| EP | 2338731 A1 | 6/2011 |
| JP | 6-275104 A | 9/1994 |
| JP | 2000-233684 A | 8/2000 |
| JP | 2007-99078 A | 4/2007 |
| JP | 2007-112250 A | 5/2007 |
| JP | 2009-220649 A | 10/2009 |
| JP | 2009-269511 A | 11/2009 |
| JP | 2010-162960 A | 7/2010 |

* cited by examiner

|  | | RELATIVE VELOCITY (km/h) | | | |
| --- | --- | --- | --- | --- | --- |
|  | | 90 | 150 | 230 | 330 |
| INTER-VEHICULAR DISTANCE (m) | 80 | 0.81 | 1.66 | – | – |
| | 100 | 0.49 | 0.95 | 1.86 | – |
| | 200 | 0.11 | 0.20 | 0.33 | 0.54 |
| | 400 | 0.03 | 0.05 | 0.07 | 0.11 |
| | 600 | 0.01 | 0.02 | 0.03 | 0.05 |
| | 800 | 0.01 | 0.01 | 0.02 | 0.02 |

VEHICULAR LIGHT DISTRIBUTION CONTROL SYSTEM AND VEHICULAR LIGHT DISTRIBUTION CONTROL METHOD

CROSS REFERENCE TO RELATED APPLICATIONS

This is a National Stage of International Application No. PCT/JP2010/070229 filed Nov. 12, 2010, the content of all of which is incorporated herein by reference in its entirety.

TECHNICAL FIELD

The present invention relates to a vehicular light distribution control system and a vehicular light distribution control method which control a light distribution of headlights depending on a position of a detected vehicle driving in front of occupant's vehicle. In particular, the present invention relates to a vehicular light distribution control system and a vehicular light distribution control method which prevent a driver in an anterior vehicle from being dazzled.

BACKGROUND ART

Conventionally, a vehicular headlight device which detects a preceding vehicle driving in front of an occupant's vehicle by using a camera and controls a light distribution of headlights depending on a position of the preceding vehicle is known (see Patent Document 1 for example).

This vehicular headlight device determines whether a preceding vehicle has moved into a predetermined partial region in an image captured by the camera. The vehicular headlight device sets margins adjacent to either sides of the partial region in consideration of an installation error and a detection error of the camera or component tolerance and an installation error of a headlight unit. Then, the vehicular headlight device determines that the preceding vehicle is within the partial region if the vehicular headlight device detects the preceding vehicle within an enlarged region including the margins. Then, the vehicular headlight device switches off light emitting elements which irradiate the partial region.

Alternatively, the vehicular headlight device determines that the preceding vehicle is going to be within the partial region before the preceding vehicle actually goes into the partial region or the enlarged region including the margins if a horizontal moving velocity of the preceding vehicle which horizontally moves toward the partial region is greater than a predetermined value. Then, the vehicular headlight device switches off light emitting elements which irradiate the partial region.

In this way, the vehicular headlight device switches off related light emitting elements without a delay when an occupant's vehicle makes a turn, even if the preceding vehicle goes into the partial region at an apparent high speed, so that it can prevent a driver of the preceding vehicle from being dazzled.

PRIOR ART DOCUMENTS

[Patent Document 1] Japanese Patent Application Publication No. 2009-220649

DISCLOSURE OF THE INVENTION

Problems to be Solved by the Invention

However, the vehicular headlight device in Patent Document 1 only changes a timing of irradiation or unirradiation of a partial region having a certain size while setting an enlarged region including predetermined margins for the partial region or while detecting a horizontal moving velocity of a preceding vehicle in order to determine whether the preceding vehicle exists in the partial region. The vehicular headlight device does not change a size itself of the partial region in which the irradiation or the unirradiation is switched. The vehicular headlight device only switches off light emitting elements related to the partial region if it detects or determines that a preceding vehicle exists within the partial region.

Thus, the vehicular headlight device in Patent Document 1 sets an entire partial region as an unirradiated region once it detects or determines that a preceding vehicle exists within the partial region independently of an inter-vehicular distance between an occupant's vehicle and the preceding vehicle. Thus, the vehicular headlight device sets an excessive region as an unirradiated region if an inter-vehicular distance is large. Also, there is a possibility that the vehicular headlight device irradiates a region which should be an unirradiated region under normal circumstances if an inter-vehicular distance is small and therefore dazzles a driver of the preceding vehicle.

In view of the above-mentioned points, it is an object of the present invention to provide a vehicular light distribution control system and a vehicular light distribution control method which maximize an irradiated region by headlights while preventing a driver of an anterior vehicle from being dazzled.

Means for Solving Problems

To achieve the object above, a vehicular light distribution control system according to an embodiment of the present invention is a vehicular light distribution control system configured to control a light distribution of headlights, including a vehicle detecting part configured to detect an anterior vehicle driving in front of an occupant's vehicle, an unirradiated region setting part configured to set a region where the anterior vehicle detected by the vehicle detecting part exists as an unirradiated region, a vehicle motion estimating part configured to estimate an ensuing motion of the anterior vehicle detected by the vehicle detecting part, and an unirradiated region adjusting part configured to adjust a size of the unirradiated region set by the unirradiated region setting part depending on an estimated result of the vehicle motion estimating part.

Also, a vehicular light distribution control method according to an embodiment of the present invention is a vehicular light distribution control method configured to control a light distribution of headlights, including a vehicle detecting step which detects an anterior vehicle driving in front of an occupant's vehicle, an unirradiated region setting step which sets a region where the anterior vehicle detected in the vehicle detecting step exists as an unirradiated region, a vehicle motion estimating step which estimates an ensuing motion of the anterior vehicle detected in the vehicle detecting step, and an unirradiated region adjusting step which adjusts a size of the unirradiated region set in the unirradiated region setting step depending on an estimated result in the vehicle motion estimating step.

Effect of the Invention

Due to the above means, the present invention is able to provide a vehicular light distribution control system and a vehicular light distribution control method which maximize an irradiated region by headlights while preventing a driver of an anterior vehicle from being dazzled.

MODE FOR CARRYING OUT THE INVENTION

With reference to the figures, the best mode for carrying out the present invention is described below.

First Embodiment

Figure 1:
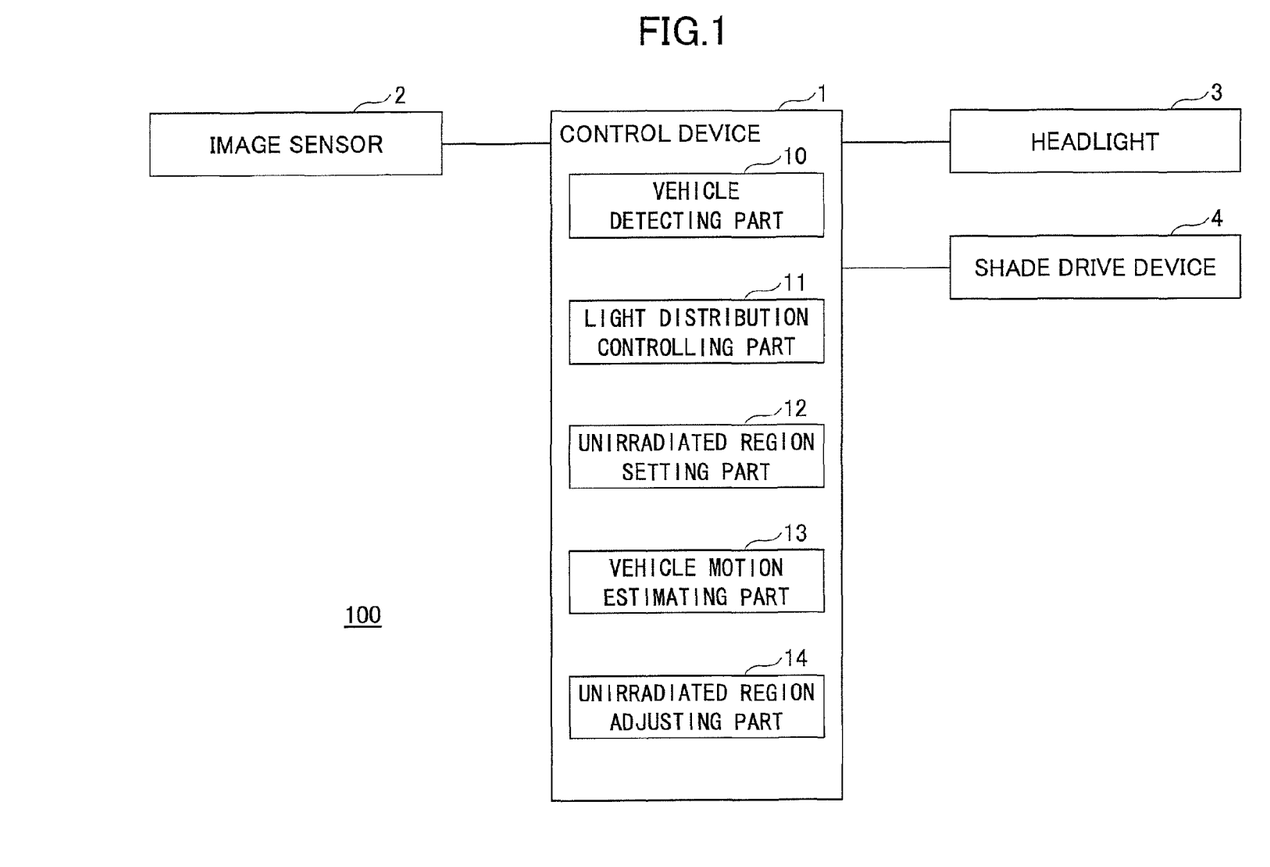
FIG. 1 is a block diagram illustrating a configuration example of a vehicular light distribution control system according to an embodiment of the present invention.

FIG. 1 is a block diagram illustrating a configuration example of a vehicular light distribution control system 100 according to an embodiment of the present invention.

The vehicular light distribution control system 100 is an in-vehicle device configured to perform light distribution control of headlights 3 based on an output of an image sensor 2 capturing an image of a scene in front of a vehicle. The system 100 mainly includes a control device 1, an image sensor 2, headlights 3, and a shade drive device 4.

The control device 1 is an in-vehicle computer including a Central Processing Unit (CPU), a Random Access Memory (RAM), a Read-Only Memory (ROM), a Non Volatile Random Access Memory (NVRAM), and the like. For example, the control device 1 stores on the ROM respective programs corresponding to a vehicle detecting part 10, a light distribution controlling part 11, an unirradiated region setting part 12, a vehicle motion estimating part 13, and an unirradiated region adjusting part 14. Then, the control device 1 loads programs in the RAM when needed, and causes the CPU to run processes corresponding to respective parts. Each of the vehicle detecting part 10, the light distribution controlling part 11, the unirradiated region setting part 12, the vehicle motion estimating part 13, and the unirradiated region adjusting part 14 may be achieved by hardware such as an Application Specific Integrated Circuit (ASIC).

The image sensor 2 is configured to capture an image of a scene in front of a vehicle. For example, the image sensor 2 is a camera having an imaging element such as a Charge-Coupled Device (CCD), a Complementary Metal Oxide Semiconductor (CMOS), or the like. The image sensor 2 is mounted to an upper part of a front window inside a vehicle interior, and outputs a captured image to the control device 1.

The headlights 3 are configured to irradiate regions in front of a vehicle. For example, the headlights 3 are halogen bulb headlights, High Intensity Discharge (HID) headlights, Light Emitting Diode (LED) headlights, or the like.

The shade drive device 4 is configured to drive light blocking plates (shades) which block out a part of the light from the headlights 3. For example, the shade drive device 4 is a motor, a solenoid, a linear actuator, or the like which rotates a rotary shade located in a light path of the headlights 3 or translates a linear drive shade located in a light path of the headlights 3. The shade drive device 4 enables a width of an after-mentioned unirradiated region to be adjusted steplessly.

Specifically, the shade drive device 4 drives shades which block out a part of the light from the headlights 3 and located near light sources of the headlights 3, based on a control signal from the control device 1, in order to achieve a variety of light distribution patterns by the headlights 3 while driving. The light distribution patterns include a high beam pattern, a low beam pattern, a pattern in chasing a preceding vehicle (discussed below), a pattern in approaching an oncoming vehicle (discussed below), or the like.

Next, a variety of functional elements of the control device 1 will be explained.

The vehicle detecting part 10 is a functional element configured to detect other vehicles driving in front of an occupant's vehicle based on an output of the image sensor 2. The other vehicles include a preceding vehicle traveling in the same direction as a traveling direction of the occupant's vehicle and an oncoming vehicle traveling in an opposite direction to the traveling direction of the occupant's vehicle, and are hereinafter referred to as an "anterior vehicle", respectively. For example, the vehicle detecting part 10 extracts a pixel which exists in an image captured by the image sensor 2 and has a brightness greater than or equal to a predetermined value (hereinafter referred to as a "high brightness pixel"), and determines the presence or absence of an anterior vehicle based on location of the extracted high brightness pixels.

Specifically, the vehicle detecting part 10 determines the presence or absence of a preceding vehicle based on the presence or absence of a group of pixels (a group of red-colored high brightness pixels) corresponding to a taillight of the preceding vehicle. Preferably, the vehicle detecting part 10 detects the presence of the preceding vehicle and an angle between a traveling direction of the occupant's vehicle and a direction to the preceding vehicle (for example, a direction to an intermediate point between a pair of left and right taillights of the preceding vehicle) viewed from the occupant's vehicle (hereinafter referred to as a "preceding vehicle detection angle") by detecting a pair of left and right taillights of the preceding vehicle.

Also, the vehicle detecting part 10 determines the presence or absence of an oncoming vehicle based on the presence or absence of a group of pixels (a group of white-colored high brightness pixels) corresponding to a headlight of the oncoming vehicle. Preferably, the vehicle detecting part 10 detects the presence of the oncoming vehicle and an angle between a traveling direction of the occupant's vehicle and a direction to the oncoming vehicle (for example, a direction to an intermediate point between a pair of left and right headlights of the oncoming vehicle) viewed from the occupant's vehicle (hereinafter referred to as a "oncoming vehicle detection angle") by detecting a pair of left and right headlights of the oncoming vehicle.

Also, the vehicle detecting part 10 derives an inter-vehicular distance between the occupant's vehicle and the preceding vehicle or the oncoming vehicle based on a distance between two high brightness pixel groups corresponding to a pair of left and right taillights of the preceding vehicle or a pair of left and right headlights of the oncoming vehicle (a distance between the taillights or a distance between the headlights). The inter-vehicular distance is, for example, a distance between an optical center of the image sensor 2 mounted on the occupant's vehicle and a center of a rear-end portion of the preceding vehicle or a center of a front-end portion of the oncoming vehicle.

The vehicle detecting part 10 may detect an inter-vehicular distance between the occupant's vehicle and an anterior vehicle, an anterior vehicle detection angle, or the like, by using a distance measuring device (not shown) such as a laser radar sensor, a millimeter-wave sensor, or an ultrasonic sensor. Also, the vehicle detecting part 10 may derive the inter-vehicular distance, the anterior vehicle detection angle, or the like, by using disparity of a stereo camera.

The vehicle detecting part 10 records inter-vehicular distances between the occupant's vehicle and the anterior vehicle derived at each predetermined control period on the RAM. Then, the vehicle detecting part 10 derives a relative velocity of the anterior vehicle to the occupant's vehicle from two immediate inter-vehicular distance values, for example. The relative velocity is, for example, a value obtained by dividing a difference between two inter-vehicular distance values by the control period.

The light distribution controlling part 11 is a functional element configured to control a light distribution pattern of the headlights 3. For example, the light distribution controlling part 11 generates a desired light distribution pattern by outputting a control signal to the shade drive device 4.

Specifically, the light distribution controlling part 11 outputs a control signal to the shade drive device 4 if the vehicle detecting part 10 detects a preceding vehicle. Then, the light distribution controlling part 11 generates a light distribution pattern which is based on a high beam pattern and includes a concave unirradiated region for preventing a portion of the preceding vehicle from being irradiated by the light of the headlights 3 in order to prevent a driver of the preceding vehicle from being dazzled (hereinafter referred to as a "pattern in chasing a preceding vehicle").

Also, if the vehicle detecting part 10 detects an oncoming vehicle, the light distribution controlling part 11 generates a light distribution pattern which is based on a high beam pattern and includes a concave unirradiated region for preventing a portion of the oncoming vehicle from being irradiated by the light of the headlights 3 in order to prevent a driver of the oncoming vehicle from being dazzled (hereinafter referred to as a "pattern in approaching an oncoming vehicle").

Hereinafter, the pattern in chasing a preceding vehicle and the pattern in approaching an oncoming vehicle are referred to collectively as an "anterior vehicle pattern".

Figure 2A:
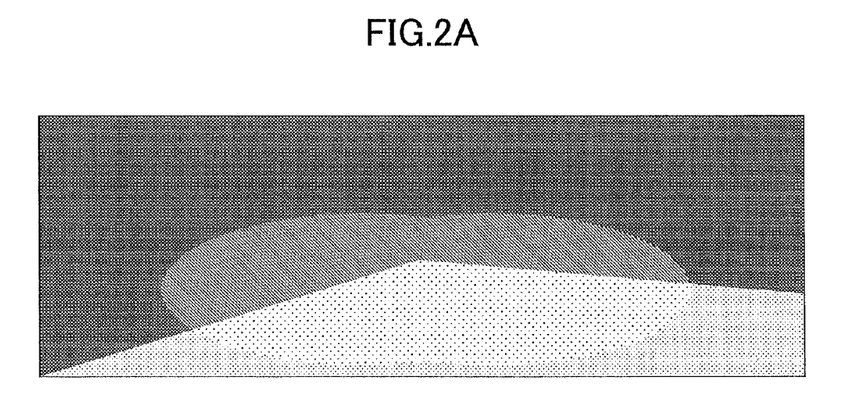
FIG. 2A is a diagram illustrating a high beam pattern in a case where it is determined that there is not an anterior vehicle in front of an occupant's vehicle.
Figure 2B:
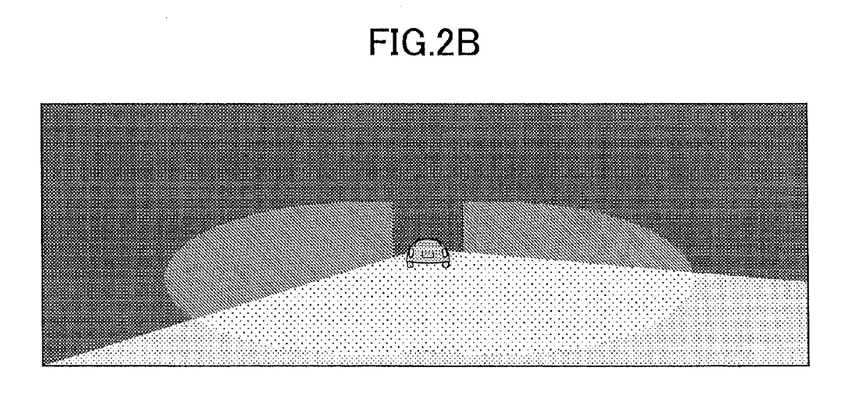
FIG. 2B is a diagram illustrating an anterior vehicle pattern in a case where it is determined that there is an anterior vehicle in front of and relatively remote from an occupant's vehicle.
Figure 2C:
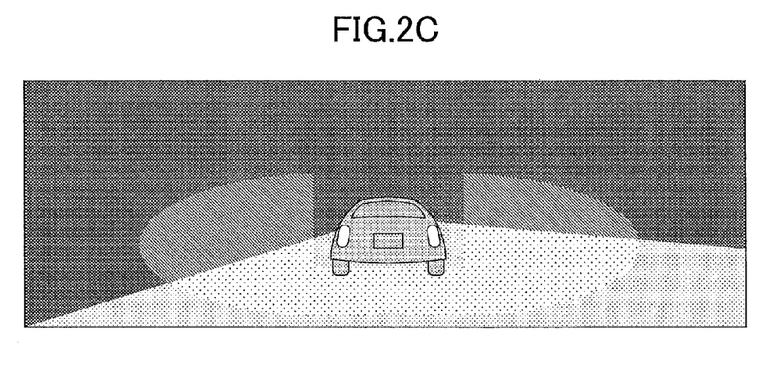
FIG. 2C is a diagram illustrating an anterior vehicle pattern in a case where it is determined that there is an anterior vehicle in front of and relatively close to an occupant's vehicle.
Figure 2D:
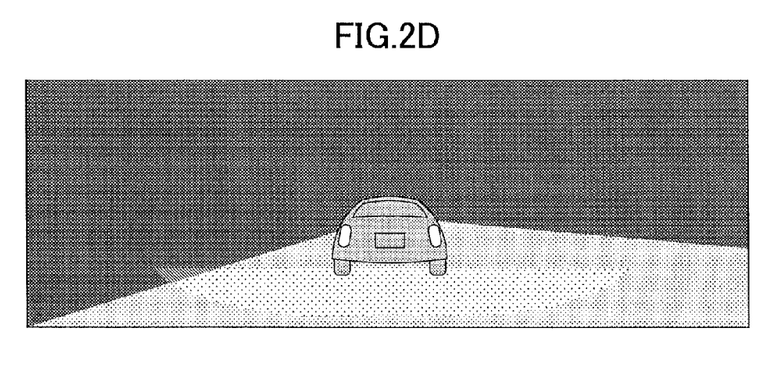
FIG. 2D is a diagram illustrating a low beam pattern in a case where it is determined that there is an anterior vehicle in front of and relatively close to an occupant's vehicle.

FIGS. 2A-2D are diagrams illustrating examples of a light distribution pattern generated by the light distribution controlling part 11. FIG. 2A illustrates a high beam pattern in a case where it is determined that there is not an anterior vehicle in front of an occupant's vehicle. FIG. 2b illustrates an anterior vehicle pattern (a pattern in chasing a preceding vehicle in this case) in a case where it is determined that there is an anterior vehicle (a preceding vehicle in this case) in front of and relatively remote from an occupant's vehicle. FIG. 2C illustrates an anterior vehicle pattern (a pattern in chasing a preceding vehicle) in a case where it is determined that there is an anterior vehicle (a preceding vehicle) in front of and relatively close to an occupant's vehicle. FIG. 2D illustrates a low beam pattern in a case where it is determined that there is an anterior vehicle (a preceding vehicle) in front of and relatively close to an occupant's vehicle.

The unirradiated region setting part 12 is a functional element configured to set an unirradiated region. For example, the unirradiated region setting part 12 sets an unirradiated region within a pattern in chasing a preceding vehicle based on a position of taillights of the preceding vehicle (a region around the preceding vehicle not irradiated by the light of the headlights 3). Alternatively, the unirradiated region setting part 12 sets an unirradiated region within a pattern in approaching an oncoming vehicle based on a position of headlights of the oncoming vehicle (a region around the oncoming vehicle not irradiated by the light of the headlights 3).

Specifically, the unirradiated region setting part 12 sets a cut line (a border line between an irradiated region and an unirradiated region) at a predetermined margin distance in a vehicle width direction horizontally and outward from a center position of a taillight (a group of red-colored high brightness pixels) of a preceding vehicle detected based on an image captured by the image sensor 2 (for example, leftward from a center position of a left taillight in the image or rightward from a center position of a right taillight in the image).

Also, the unirradiated region setting part 12 sets a cut line (a border line between an irradiated region and an unirradiated region) at a predetermined margin distance in a vehicle width direction horizontally and outward from a center position of headlights (a group of white-colored high brightness pixels) of an oncoming vehicle detected based on an image captured by the image sensor 2 (for example, leftward from a center position of a left headlight in the image or rightward from a center position of a right headlight in the image).

Figure 3:
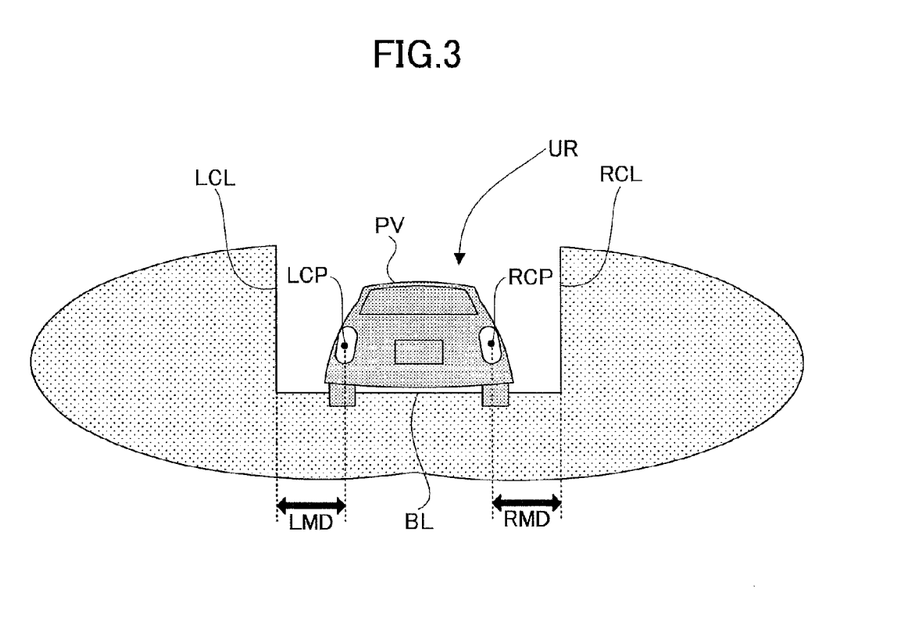
FIG. 3 is a diagram illustrating an example of an unirradiated region set by an unirradiated region setting part.

FIG. 3 is a diagram illustrating an example of an unirradiated region UR set by the unirradiated region setting part 12. The unirradiated region UR is delimited by a left cut line LCL, a right cut line RCL, and a base line BL. The left cut line LCL is set at a left margin distance LMD leftward from a center position LCP of a left taillight of a preceding vehicle PV. The right cut line is set at a right margin distance RMD rightward from a center position RCP of a right taillight of the preceding vehicle PV.

The left margin distance LMD and the right margin distance RMD are predefined in consideration of an installation error and a detection error of the image sensor 2, component tolerance and an installation error of the headlights 3, control accuracy and control speed of the shade drive device 4, tilt in a vehicle width direction of an anterior vehicle during turns, a reflection from a vehicle body and a door mirror of an anterior vehicle, or the like, in order to create an unirradiated region UR having a size sufficient for preventing a driver of an anterior vehicle from being dazzled even if they are affected thereby. The left margin distance LMD and the right margin distance RMD are basically set to be the same size. However, they may be set to be different sizes.

Also, the left margin distance LMD and the right margin distance RMD are set so that they increase with a decrease in an inter-vehicular distance between an occupant's vehicle and an anterior vehicle. This is because an apparent lateral moving distance of the anterior vehicle in the image increases with a decrease in the inter-vehicular distance even if an actual lateral moving distance of the anterior vehicle is unchanged. Also, this is because an apparent lateral moving velocity of the anterior vehicle in the image increases with a decrease in the inter-vehicular distance even if an actual lateral moving velocity of the anterior vehicle is unchanged. Also, this is to surely prevent a driver of the anterior vehicle from being dazzled even if such a lateral movement of the anterior vehicle arises unexpectedly.

The light distribution controlling part 11 calculates a target unirradiated angle based on an inter-vehicular distance between an occupant's vehicle and an anterior vehicle and an anterior vehicle detection angle detected by the vehicle detecting part 10 and a margin distance set by the unirradiated region setting part 12. Then, the light distribution controlling part 11 creates a desired unirradiated region UR by outputting the calculated target unirradiated angle to the shade drive device 4.

Figure 4:
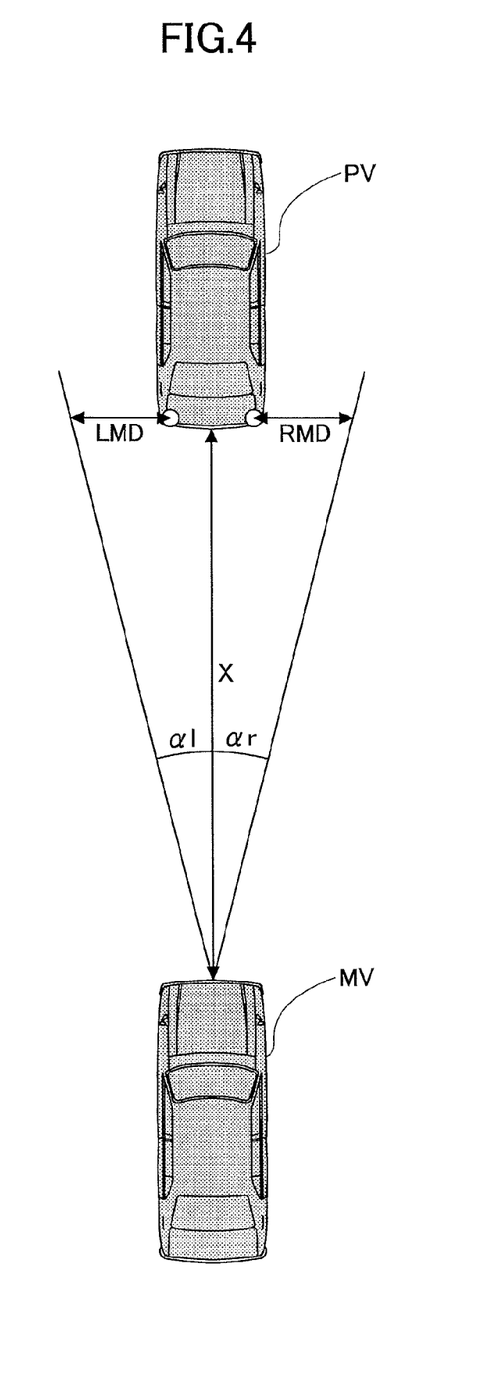
FIG. 4 is a diagram illustrating an example of a target unirradiated angle calculated by a light distribution controlling part.

FIG. 4 illustrates an example of a target unirradiated angle calculated by the light distribution controlling part 11. A left target unirradiated angle αl is calculated on an inter-vehicular distance X between an occupant's vehicle MV and a preceding vehicle PV and a preceding vehicle detection angle (0 degrees in this case) detected by the vehicle detecting part 10 and a left margin distance LMD (to be exact, a distance obtained by adding a distance between a center position of the preceding vehicle PV and a center position of a left taillight to the left margin distance LMD) set by the unirradiated region setting part 12. A right target unirradiated angle αr is calculated on the inter-vehicular distance X between the occupant's vehicle MV and the preceding vehicle PV and the preceding vehicle detection angle (0 degrees in this case) detected by the vehicle detecting part 10 and a right margin distance RMD (to be exact, a distance obtained by adding a distance between the center position of the preceding vehicle PV and a center position of a right taillight to the right margin distance RMD) set by the unirradiated region setting part 12.

In a case where the preceding vehicle detection angle is not 0 degrees, the light distribution controlling part 11 derives a traveling-direction component (a component in a traveling direction of the occupant's vehicle MV) and a vehicle-width-direction component (a component in a vehicle width direction of the occupant's vehicle MV) of the inter-vehicular distance X based on the inter-vehicular distance X and the preceding vehicle detection angle. Then, the light distribution controlling part 11 calculates a target unirradiated angle based on the traveling-direction component, the vehicle-width-direction component, and a margin distance.

Also, the light distribution controlling part 11 increases a driving speed of shades by the shade drive device 4 with an increase in a difference of the calculated target unirradiated angle and a current unirradiated angle (an angle obtained from an output of an encoder, etc. (not shown) attached to the shade drive device 4). This is to prevent a driver of a preceding vehicle from being dazzled due to a delay of the shade drive. If the light distribution controlling part 11 determines that it can not achieve a desired driving speed of the shades even if it maximizes a driving speed of the shades, it switches a light distribution pattern of the headlights 3 to a low beam pattern. This is to prevent a driver of the preceding vehicle from being dazzled due to a delay of the shade drive.

The vehicle motion estimating part 13 is a functional element configured to estimate motion of an anterior vehicle. For example, the vehicle motion estimating part 13 determines that the anterior vehicle is going to turn left or right at an intersection or the anterior vehicle is going to make a lane change, by detecting a blinking of a turn-signal lamp of the anterior vehicle in an image captured by the image sensor 2.

Also, the vehicle motion estimating part 13 determines whether the anterior vehicle is going to make a lane change, or whether the anterior vehicle is going to enter a curve, based on a direction or a magnitude of horizontal motion of the anterior vehicle in the image captured by the image sensor 2.

Also, the vehicle motion estimating part 13 determines whether an anterior vehicle is going to enter a curve based on an inclination angle of a line segment connecting a pair of left and right taillights of an preceding vehicle to a horizontal line or an inclination angle of a line segment connecting a pair of left and right headlights of an oncoming vehicle to a horizontal line.

Also, the vehicle motion estimating part 13 may determine whether an anterior vehicle is going to enter a curve by obtaining a shape or a curvature of a road in front of an occupant's vehicle by using a navigation system (not shown).

Also, the vehicle motion estimating part 13 determines an approach status of an oncoming vehicle or a timing of passing of each other based on a relative velocity of the oncoming vehicle to an occupant's vehicle derived by the vehicle detecting part 10. Alternatively, the vehicle motion estimating part 13 determines an approach status of a preceding vehicle based on a relative velocity of the preceding vehicle to an occupant's vehicle derived by the vehicle detecting part 10. The relative speed has, for example, a positive value when the anterior vehicle approaches the occupant's vehicle and a negative value when the anterior vehicle distances itself from the occupant's vehicle.

The unirradiated region adjusting part 14 is a functional element configured to adjust a size of an unirradiated region UR. For example, the unirradiated region adjusting part 14 adjusts a size of the unirradiated region UR steplessly depending on an estimated result by the vehicle motion estimating part 13.

Specifically, the unirradiated region adjusting part 14 expands an unirradiated region UR set by the unirradiated region setting part 12 leftward or rightward when it is determined by the vehicle motion estimating part 13 that a preceding vehicle driving in the same lane as an occupant's vehicle is going to make a lane change to a left lane or a right lane.

Also, the unirradiated region adjusting part 14 expands the unirradiated region UR leftward or rightward when it is determined that the anterior vehicle is going to enter a left-hand curve or a right-hand curve, or when it is determined that the anterior vehicle is going to turn left or right at an intersection.

Also, the unirradiated region adjusting part 14 expands the unirradiated region UR when it is determined that a preceding vehicle is rapidly approaching an occupant's vehicle, and contracts the unirradiated region UR when it is determined that a preceding vehicle is distancing itself from an occupant's vehicle rapidly.

In this case, the unirradiated region adjusting part 14 decides on a step size of fluctuation (a step size of expansion or a step size of contraction) and a fluctuation rate (an expansion rate or a contraction rate) of the unirradiated region UR depending on an inter-vehicular distance between an occupant's vehicle and a preceding vehicle derived by the vehicle detecting part 10. The unirradiated region adjusting part 14 increases the step size of fluctuation and the fluctuation rate of the unirradiated region UR with a decrease in the inter-vehicular distance. This is because an apparent lateral moving distance of a preceding vehicle in an image increases with a decrease in the inter-vehicular distance even if an actual lateral moving distance of the preceding vehicle is unchanged. Also, this is because an apparent lateral moving speed of the preceding vehicle in the image increases with a decrease in the inter-vehicular distance even if an actual lateral moving speed of the preceding vehicle is unchanged.

Also, the unirradiated region adjusting part 14 decides on a step size of fluctuation (a step size of expansion or a step size of contraction) and a fluctuation rate (an expansion rate or a contraction rate) of the unirradiated region UR depending on an absolute value of a relative velocity of an anterior vehicle to an occupant's vehicle derived by the vehicle detecting part 10. The unirradiated region adjusting part 14 increases the step size of fluctuation and the fluctuation rate of the unirradiated region UR with an increase in an absolute value of the relative velocity. This is because an apparent expansion/contraction rate of a size of the anterior vehicle in the image increases with an increase in an absolute value of a relative velocity.

Also, the unirradiated region adjusting part 14 decides on a step size of fluctuation (a step size of expansion or a step size of contraction) and a fluctuation rate (an expansion rate or a contraction rate) of the unirradiated region UR depending on an increase-decrease rate of an anterior vehicle detection angle derived by the vehicle detecting part 10. The unirradiated region adjusting part 14 increases the step size of fluctuation and the fluctuation rate of the unirradiated region UR with an increase in the increase-decrease rate of the anterior vehicle detection angle. This is because it is presumed that an ensuing increase-decrease rate of the anterior vehicle detection angle increases with an increase in a current increase-decrease rate of the anterior vehicle detection angle.

The unirradiated region adjusting part 14 expands an unirradiated region UR leftward or rightward when it is determined that a preceding vehicle is going to enter a left-hand curve or a right-hand curve. Then, the unirradiated region adjusting part 14 may expand the unirradiated region UR in a direction opposite to a turn direction (rightward or leftward) if it detects that an occupant's vehicle has entered the left-hand curve or the right-hand curve, following the preceding vehicle, based on an output of a steering angle sensor (not shown) mounted in the occupant's vehicle. This is because a preceding vehicle apparently moves in a direction opposite to the turn direction when viewed from the occupant's vehicle. The light distribution controlling part 11 switches a light distribution pattern of the headlights 3 to a low beam pattern when it determines that it is impossible to prevent a driver of the preceding vehicle from being dazzled even if it expands the unirradiated region UR in a direction opposite to the turn direction, because a steering angle of the occupant's vehicle has exceeded a predetermined value. This is to prevent the driver of the preceding vehicle from being dazzled.

Next, referring to FIGS. 5-7, an example of adjustment of a size of an unirradiated region UR by the unirradiated region adjusting part 14 will be explained.

Figure 5:
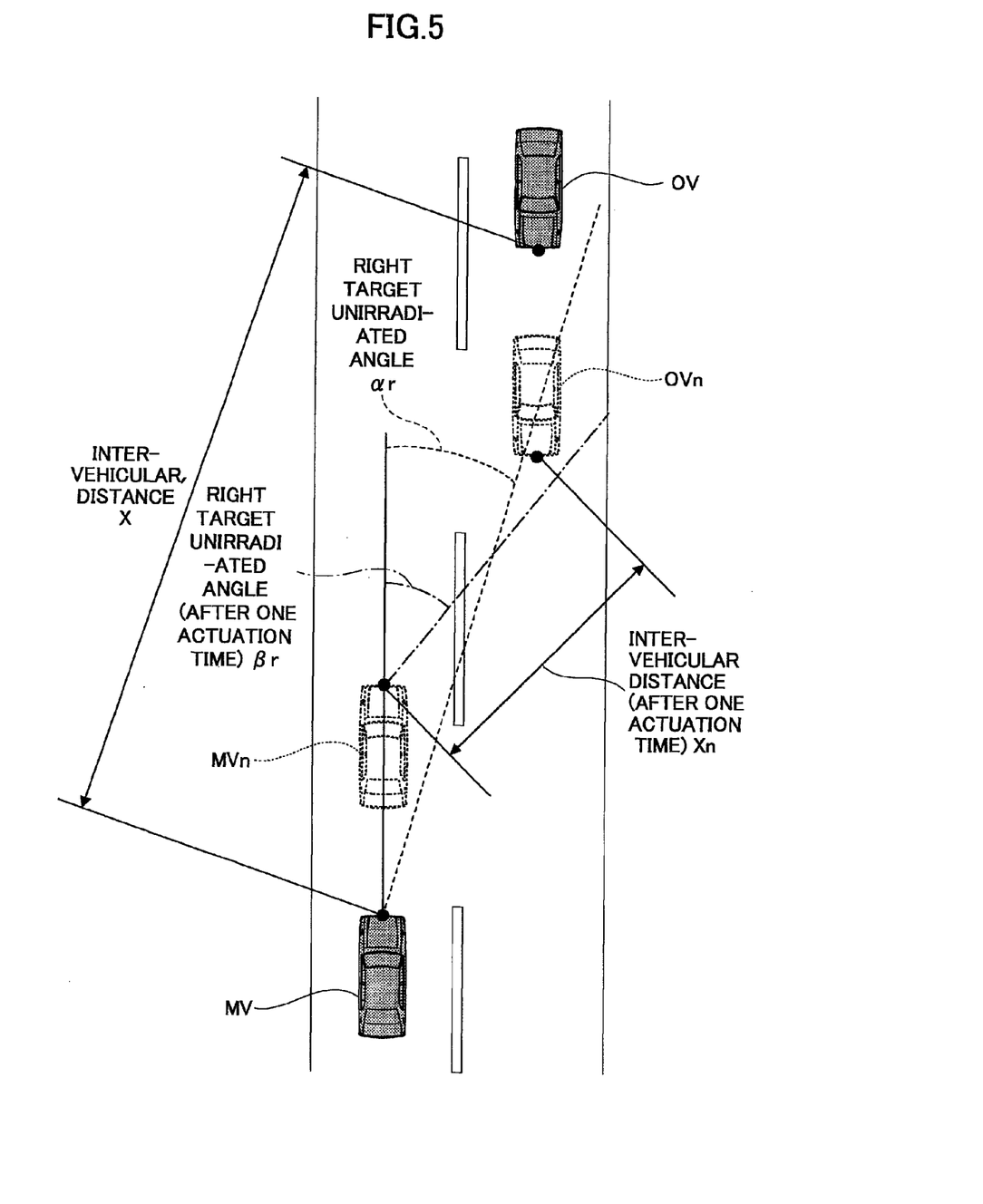
FIG. 5 is a diagram illustrating an example of a light distribution control in a case where an adjustment by an unirradiated region adjusting part is not performed.

FIG. 5 illustrates an example of a light distribution control in a case where an adjustment by the unirradiated region adjusting part 14 is not performed. FIG. 6 illustrates an example of a light distribution control in a case where an adjustment by the unirradiated region adjusting part 14 is performed. FIG. 7 illustrates a front view of an oncoming vehicle in the state of FIG. 6. Also, contents of FIGS. 5-7 and following explanations referring thereto relate to a light distribution control in left-hand traffic. However, they can be applied to a light distribution control in right-hand traffic by reversing left and right. In that case, a right target unirradiated angle $\alpha r$, a right target unirradiated angle $\beta r$, and a right target unirradiated angle $\gamma r$ are replaced with a left target unirradiated angle $\alpha 1$, a left target unirradiated angle $\beta 1$, and a left target unirradiated angle $\gamma 1$, respectively.

FIG. 5 indicates an occupant's vehicle MV and an oncoming vehicle OV facing each other across an inter-vehicular distance X at a time T1. An occupant's vehicle MVn and an oncoming vehicle OVn indicated by a dotted line indicate a state of an occupant's vehicle MV and a state of an oncoming vehicle OV after an actuation time has elapsed from the time T1, respectively.

An "actuation time" is an amount of time corresponding to one control period of the vehicular light distribution control system 100. For example, as an actuation time, the time required for the image sensor 2 to capture images in front of the occupant's vehicle MV and for the shade drive device 4 to complete creation of an unirradiated region UR by driving the shades is adopted. The adopted time is 700 milliseconds, i.e., the total time of 200 milliseconds required for the image sensor 2 to capture an image, 100 milliseconds required for a communication between the image sensor 2 and the control device 1, 100 milliseconds required for the control device 1 to detect an anterior vehicle and set an unirradiated region UR, 100 milliseconds required for a communication between the control device 1 and the shade drive device 4, and 200 milliseconds required for the shade drive device 4 to drive the shades.

As shown in FIG. 5, the vehicular light distribution control system 100 in the occupant's vehicle MV performs a light distribution control so that it can apply a pattern in approaching an oncoming vehicle including an unirradiated region UR represented by a right target unirradiated angle $\alpha r$ to the oncoming vehicle OV facing the occupant's vehicle MV across an inter-vehicular distance X at the time T1.

Also, as shown in FIG. 5, the vehicular light distribution control system 100 in the occupant's vehicle MVn after the actuation time has elapsed from the time T1 performs a light distribution control so that it can apply the pattern in approaching an oncoming vehicle including an unirradiated region UR represented by a right target unirradiated angle $\beta r$ to the oncoming vehicle OVn facing the occupant's vehicle MVn across an inter-vehicular distance Xn also after the actuation time has elapsed from the time T1.

However, in a case where a relative velocity of the oncoming vehicle OV to the occupant's vehicle MV is large, the oncoming vehicle OV enters into an irradiated region created by the headlights 3 of the occupant's vehicle MV before the vehicular light distribution control system 100 of the occupant's vehicle MV creates the pattern in approaching an oncoming vehicle including the unirradiated region UR represented by the right target unirradiated angle $\beta r$. As a result, a driver of the oncoming vehicle OV is dazzled by the headlights 3 of the occupant's vehicle MV.

To avoid the situation as described above from arising, the vehicular light distribution control system 100 of the occupant's vehicle MV estimates by the vehicle motion estimating part 13 an approach status of the occupant's vehicle MV and the oncoming vehicle OV or a timing of passing of each other based on a relative velocity of the oncoming vehicle OV to the occupant's vehicle MV, before the occupant's vehicle MV and the oncoming vehicle OV face each other across the inter-vehicular distance X (prior to the time T1).

Then, in a case where the relative velocity of the oncoming vehicle OV to the occupant's vehicle MV at the time T1 exceeds a predetermined value, the vehicular light distribution control system 100 determines that it is impossible by a normal control (a control by the unirradiated region setting part 12) to prevent a driver of the oncoming vehicle OVn after the actuation time has elapsed from being dazzled. Then, the vehicular light distribution control system 100 adjusts by the unirradiated region adjusting part 14 a size of the unirradiated region UR represented by the right target unirradiated angle αr.

Figure 6:
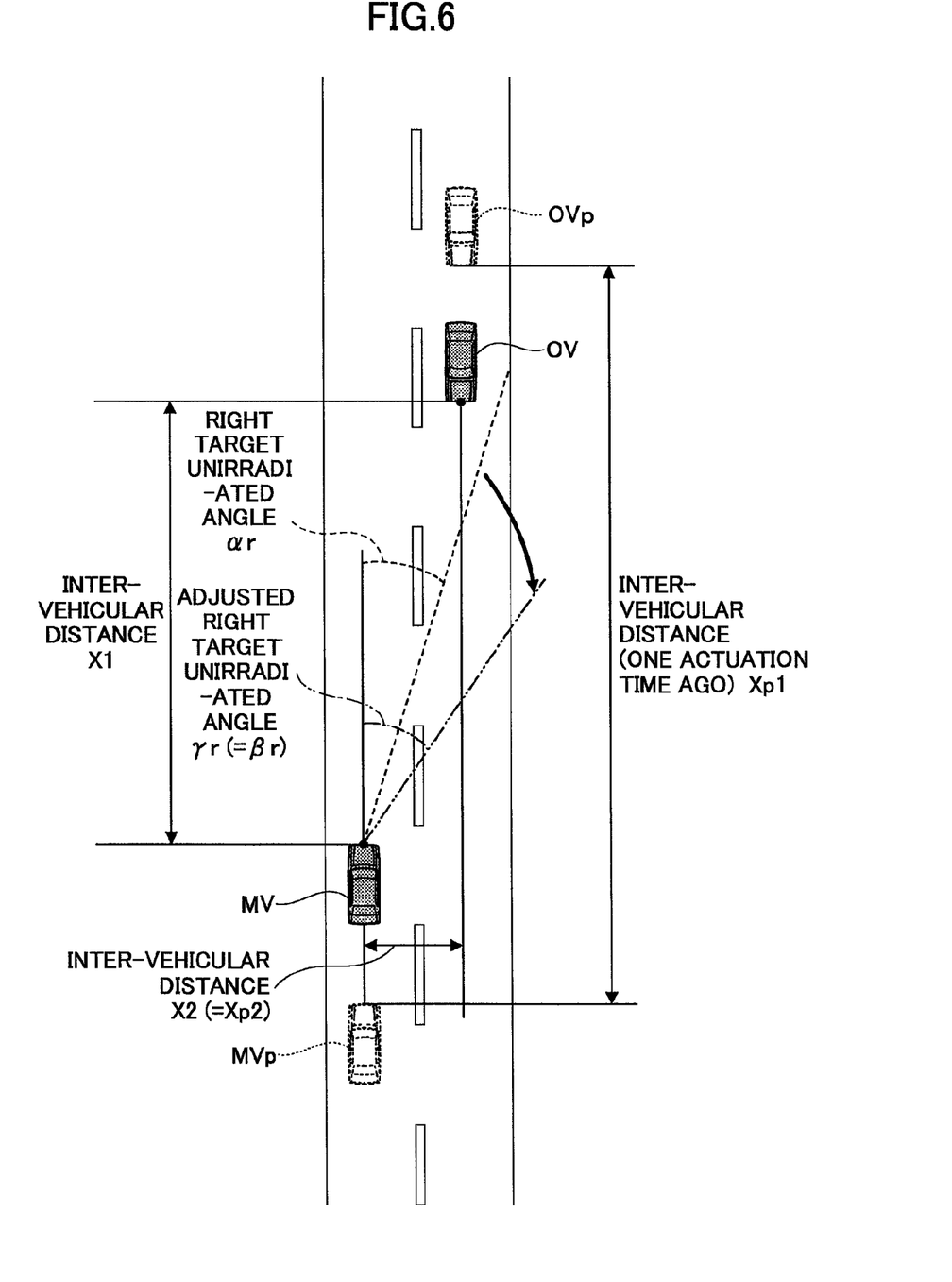
FIG. 6 is a diagram illustrating an example of a light distribution control in a case where an adjustment by an unirradiated region adjusting part is performed.
Figure 7:
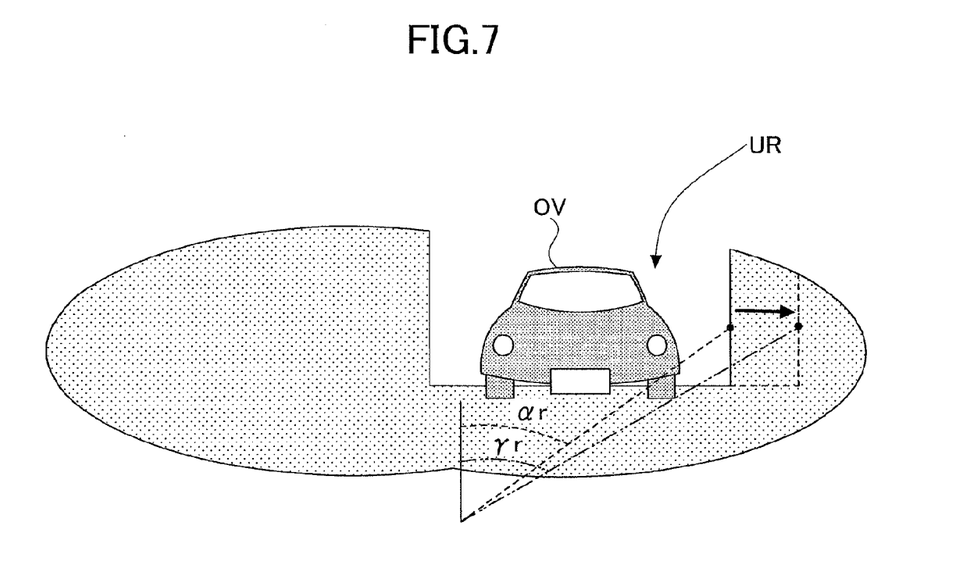
FIG. 7 is a front view of an oncoming vehicle in the state of FIG. 6.

Similar to FIG. 5, FIG. 6 illustrates the occupant's vehicle MV and the oncoming vehicle OV facing each other across the inter-vehicular distance X at the time T1. FIG. 6 also illustrates a state where the vehicular light distribution control system 100 performs a light distribution control by using a pattern in approaching an oncoming vehicle including an unirradiated region UR represented by an adjusted right target unirradiated angle γr greater than the right target unirradiated angle αr. Also, an occupant's vehicle MVp and an oncoming vehicle OVp indicated by a dotted line represent a state of an occupant's vehicle MV and a state of an oncoming vehicle OV at a time point back from the time T1 by the actuation time, respectively.

In this way, the vehicular light distribution control system 100 of the occupant's vehicle MV allows the unirradiated region adjusting part 14 to adjust a size of an unirradiated region UR represented by a right target unirradiated angle αr set by the unirradiated region setting part 12, when it is determined by the vehicle motion estimating part 13 that the oncoming vehicle OV rapidly approaches the occupant's vehicle MV due to the fact that the relative velocity of the oncoming vehicle OV at the time T1 is greater than or equal to a predetermined value.

Figure 8:
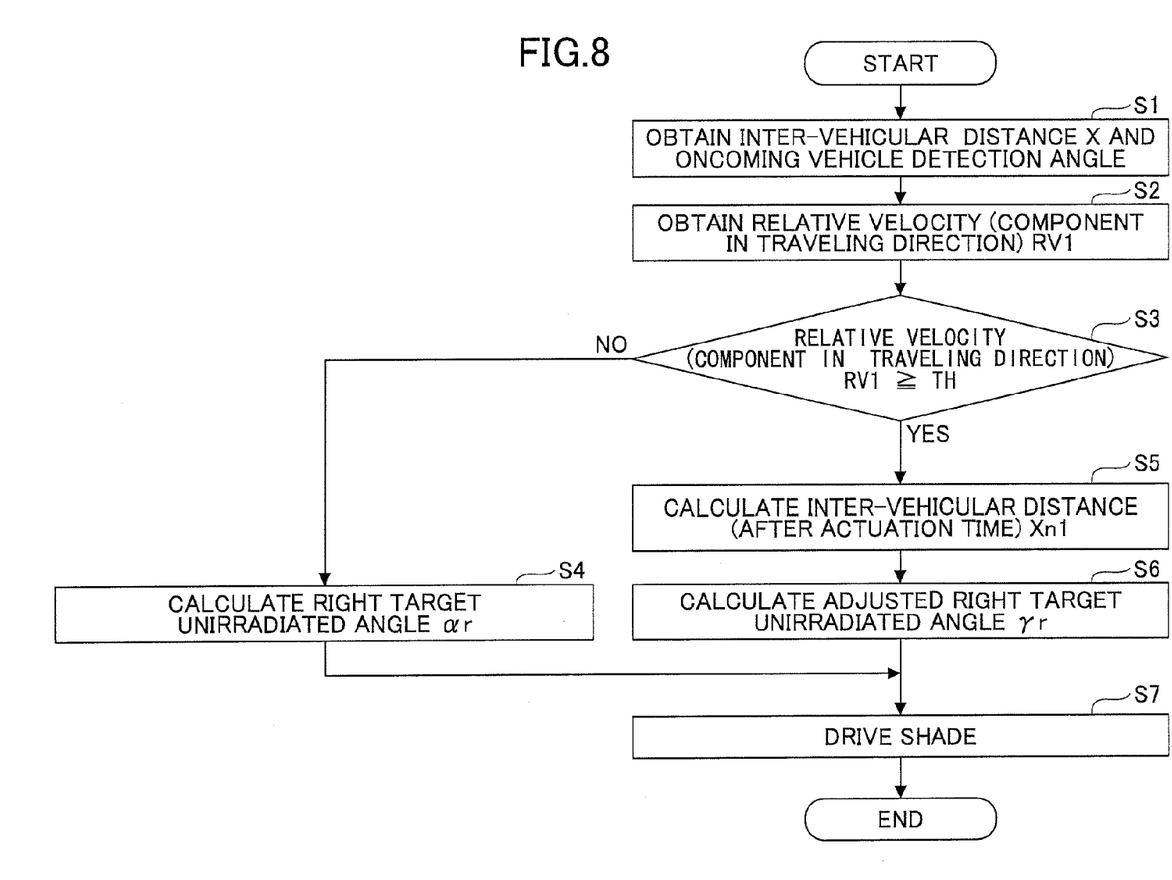
FIG. 8 is a flowchart illustrating a flow of an unirradiated region adjusting process.

Next, referring to FIG. 8, a process in which the vehicular light distribution control system 100 adjusts a size of an unirradiated region UR depending on a relative velocity of an oncoming vehicle OV (hereinafter called an "unirradiated region adjusting process") will be explained. FIG. 8 is a flowchart illustrating a flow of the unirradiated region adjusting process. The vehicular light distribution control system 100 performs this unirradiated region adjusting process for each actuation time repeatedly. Also, contents of FIG. 8 and following explanation referring to FIG. 8 relate to a light distribution control in left-hand traffic. However, they can be applied to a light distribution control in right-hand traffic by reversing left and right. In that case, a right target unirradiated angle αr, a right target unirradiated angle βr, a right target unirradiated angle γr (γr=arctan((Xn2+RMD)/Xn1)), and a right margin distance RMD are replaced with a left target unirradiated angle α1, a left target unirradiated angle β1, a left target unirradiated angle γ1 (γ1=arctan((Xn2+LMD)/Xn1)), and a left margin distance LMD, respectively.

Firstly, the control device 1 of the vehicular light distribution control system 100 detects by the vehicle detecting part 10 an inter-vehicular distance X between an occupant's vehicle MV and an oncoming vehicle OV and an oncoming vehicle detection angle, based on an image of a scene in front of the occupant's vehicle MV captured by the image sensor 2 (step S1).

Then, the control device 1 derives a traveling-direction component X1 (a component in a traveling direction of the occupant's vehicle MV) and a vehicle-width-direction component X2 (a component in a vehicle width direction of the occupant's vehicle MV) of the inter-vehicular distance X, based on the inter-vehicular distance X and the oncoming vehicle detection angle detected by the vehicle detecting part 10. Then, the control device 1 derives a traveling-direction component RV1 of a relative velocity RV of the oncoming vehicle OV, based on a similarly-derived traveling-direction component Xp1 of an inter-vehicular distance Xp at one actuation time ago (one control period ago) and the traveling-direction component X1 of the inter-vehicular distance X (step S2). The traveling-direction component RV1 is a value obtained by multiplying an inverse of a control period by a value obtained by subtracting the traveling-direction component Xp1 from the traveling-direction component X1.

Then, the control device 1 compares the traveling-direction component RV1 of the relative velocity RV of the oncoming vehicle OV at the time T1 to a predetermined value TH (step S3). If the control device 1 determines that the traveling-direction component RV1 of the relative velocity RV is less than the predetermined value TH (NO in step S3), the control device 1 calculates a right target unirradiated angle αr based on the traveling-direction component X1 and a vehicle-width-direction component X2 of the inter-vehicular distance X and a right margin distance RMD (step S4).

Then, the light distribution controlling part 11 of the control device 1 outputs the right target unirradiated angle αr to the shade drive device 4, causes the shade drive device 4 to drive the shades, and creates a pattern in approaching an oncoming vehicle including an unirradiated region UR represented by the right target unirradiated angle αr.

If the control device 1 determines that the traveling-direction component RV1 of the relative velocity RV is greater than or equal to the predetermined value TH (YES in step S3), the control device 1 derives by the unirradiated region adjusting part 14 a traveling-direction component Xn1 of an inter-vehicular distance Xn at a time point after one control period has elapsed from the time T1 (a value obtained by multiplying one control period by the traveling-direction component RV1 of the relative velocity RV), based on the traveling-direction component RV1 (step S5). The control device 1 derives a vehicle-width-direction component Xn2 of the inter-vehicular distance Xn as the same value as the vehicle-width-direction component X2 of the inter-vehicular distance X.

Then, at the time T1, the control device 1 calculates an adjusted right target unirradiated angle γr (γr=arctan((Xn2+RMD)/Xn1)) based on the traveling-direction component Xn1 and the vehicle-width-direction component Xn2 of the inter-vehicular distance Xn at a time point after one control period has elapsed from the time T1 and the right margin distance RMD (step S6).

Then, the light distribution controlling part 11 of the control device 1 outputs the adjusted right target unirradiated angle γr to the shade drive device 4, and causes the shade drive device 4 to drive the shades (step S7). Thus, the light distribution controlling part 11 creates a pattern in approaching an oncoming vehicle including an unirradiated region UR represented by the adjusted right target unirradiated angle γr.

In the present embodiment, the adjusted right target unirradiated angle γr is identical to the adjusted right target unirradiated angle βr in FIG. 5. The control device 1 expands the unirradiated region UR rightward by a difference between the right target unirradiated angle γr and the right target unirradiated angle αr (hereinafter the difference is referred to as a "margin angle"), in comparison with an unirradiated region UR set by the unirradiated region setting part 12.

Also, a vehicle detecting step, a vehicle motion estimating step, an unirradiated region setting step, and an unirradiated region adjusting step in appended claims correspond to, for example, a process in step S1, processes in steps S2 and S3, a process in step S4, and processes in steps S5-S7 of the present embodiment, respectively.

Figure 9:
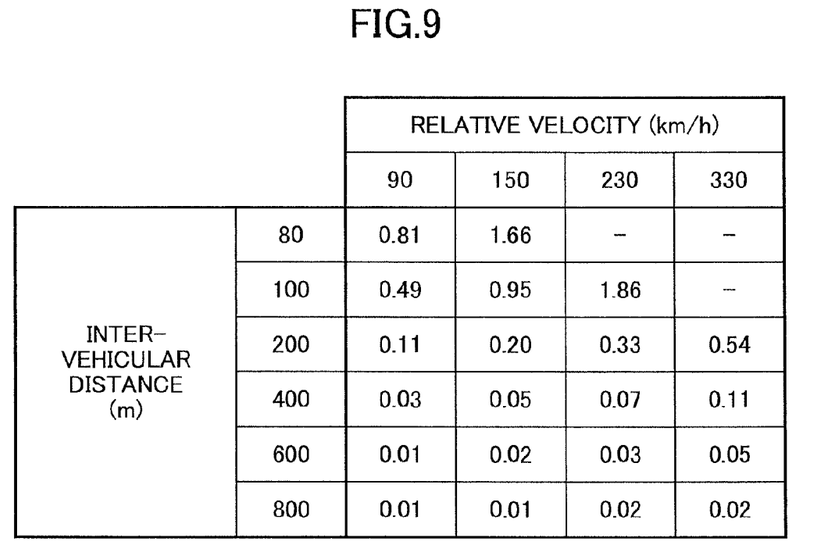
FIG. 9 is a diagram illustrating an example of a margin angle which varies with an inter-vehicular distance and a relative velocity.

FIG. 9 illustrates an example of a margin angle (degree) which varies with an inter-vehicular distance (m) and a relative velocity (km/h). For example, in a case where an inter-vehicular distance is 200 (m) and a relative velocity is 230 (km/h), FIG. 9 indicates that a margin angle of 0.33 (degrees) is adopted. Ranges where a value of a margin angle is "−" indicates ranges where a low beam pattern is adopted without adjusting a size of an unirradiated region because of the inability to drive the shades at a desired speed.

In this way, the vehicular light distribution control system 100 estimates an ensuing state of an anterior vehicle based on a current state of the anterior vehicle, and adjusts steplessly a size of an unirradiated region UR depending on the estimated result. Thus, the vehicular light distribution control system 100 can create an unirradiated region UR suitable for an ensuing state of the anterior vehicle, and can expand an irradiated region by the headlights 3 as large as possible while preventing a driver of the anterior vehicle from being dazzled.

Also, in the above, the vehicular light distribution control system 100 prevents the dazzlement due to a delay of expansion of the unirradiated region UR by expanding a size of the unirradiated region UR earlier in a case where the oncoming vehicle OV approaches at a high velocity. However, the vehicular light distribution control system 100 may avoid insufficient irradiation due to a delay of contraction of the unirradiated region UR by contracting a size of the unirradiated region UR earlier in a case where the preceding vehicle PV distances itself at high velocity.

Preferable embodiments of the present invention have been described in detail. However, the present invention is not limited to the above embodiments. Various changes and modifications to the above embodiments may be made without departing from the scope of the present invention.

For example, in the above embodiments, the vehicular light distribution control system 100 controls a light distribution pattern of the headlights 3 by causing the shade drive device 4 to drive the shades. However, instead of blocking out light by the shades, the vehicular light distribution control system 100 may use a headlight composed of plural LEDs, and control a light distribution pattern by switching off a part of the plural LEDs.

EXPLANATION OF REFERENCE SIGNS

1 Control device
2 Image sensor
3 Headlights
4 Shade drive device
10 Vehicle detecting part
11 Light distribution controlling part
12 Unirradiated region setting part
13 Vehicle motion estimating part
14 Unirradiated region adjusting part
100 Vehicular light distribution control system

The invention claimed is:

1. A vehicular light distribution control system configured to control a light distribution of headlights, comprising:
 a vehicle detecting part configured to detect an anterior vehicle driving in front of an occupant's vehicle;
 an unirradiated region setting part configured to set a region where the anterior vehicle detected by the vehicle detecting part exists as an unirradiated region;
 a vehicle motion estimating part configured to estimate an ensuing motion of the anterior vehicle detected by the vehicle detecting part;
 an unirradiated region adjusting part configured to adjust before the estimated ensuing motion occurs a size of the unirradiated region set by the unirradiated region setting part depending on the ensuing motion estimated by the vehicle motion estimating part; and
 a light distribution controlling part configured to generate before the estimated ensuing motion occurs a light distribution pattern including the unirradiated region whose size has been adjusted by the unirradiated region adjusting part,
 wherein the unirradiated region adjusting part determines on an expanding direction or a contracting direction of the unirradiated region depending on the estimated ensuing motion, and determines on a step size of expansion or a step size of contraction of the unirradiated region and an expansion rate or a contraction rate of the unirradiated region depending on an inter-vehicular distance between the occupant's vehicle and the anterior vehicle or a relative velocity of the anterior vehicle to the occupant's vehicle.

2. The vehicular light distribution control system according to claim 1, wherein the unirradiated region adjusting part changes the step size of expansion or the step size of contraction of the unirradiated region depending on the distance between the occupant's vehicle and the anterior vehicle.

3. The vehicular light distribution control system according to claim 2, wherein the unirradiated region adjusting part increases the step size of expansion or the step size of contraction of the unirradiated region with a decrease in the distance between the occupant's vehicle and the anterior vehicle.

4. The vehicular light distribution control system according to claim 1, wherein the unirradiated region adjusting part changes the step size of expansion or the step size of contraction of the unirradiated region depending on the relative velocity of the anterior vehicle to the occupant's vehicle.

5. The vehicular light distribution control system according to claim 1, wherein the unirradiated region adjusting part increases the step size of expansion or the step size of contraction of the unirradiated region with an increase in an absolute value of the relative velocity of the anterior vehicle to the occupant's vehicle.

6. The vehicular light distribution control system according to claim 1, wherein the unirradiated region adjusting part changes the step size of expansion or the step size of contraction of the unirradiated region depending on an increase-decrease rate of an anterior vehicle detection angle.

7. The vehicular light distribution control system according to claim 6, wherein the unirradiated region adjusting part increases the step size of expansion or the step size of contraction of the unirradiated region with an increase in the increase-decrease rate of the anterior vehicle detection angle.

8. A vehicular light distribution control method configured to control a light distribution of headlights, comprising:
 a vehicle detecting step which detects an anterior vehicle driving in front of an occupant's vehicle;
 an unirradiated region setting step which sets a region where the anterior vehicle detected in the vehicle detecting step exists as an unirradiated region;
 a vehicle motion estimating step which estimates an ensuing motion of the anterior vehicle detected in the vehicle detecting step;
 an unirradiated region adjusting step which adjusts before the estimated ensuing motion occurs a size of the unirradiated region set in the unirradiated region setting step depending on the ensuing motion estimated in the vehicle motion estimating step; and
 a light distribution controlling step which generates before the estimated ensuing motion occurs a light distribution pattern including the unirradiated region whose size has been adjusted in the unirradiated region adjusting step,
 wherein the unirradiated region adjusting part determines an expanding direction or a contracting direction of the unirradiated region depending on the estimated ensuing motion, and determines a step size of expansion or a step size of contraction of the unirradiated region and an expansion rate or a contraction rate of the unirradiated region depending on an inter-vehicular distance between the occupant's vehicle and the anterior vehicle or a relative velocity of the anterior vehicle to the occupant's vehicle.

* * * * *